No. 646,418. Patented Apr. 3, 1900.
W. DODD & A. D. STRUTHERS.
MACHINE FOR GENERATING AND UTILIZING STATIC ELECTRICITY.
(Application filed July 14, 1899.)
(No Model.) 6 Sheets—Sheet 1.
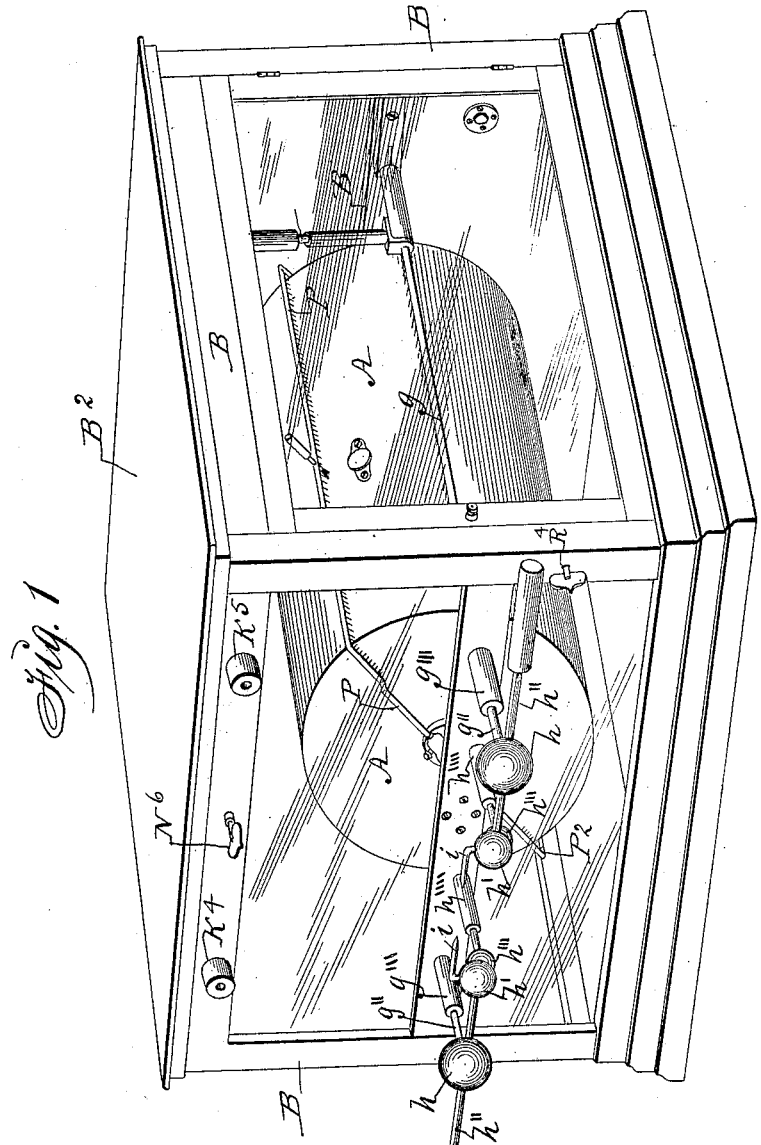

No. 646,418. Patented Apr. 3, 1900.
W. DODD & A. D. STRUTHERS.
MACHINE FOR GENERATING AND UTILIZING STATIC ELECTRICITY.
(Application filed July 14, 1899.)
(No Model.) 6 Sheets—Sheet 2.
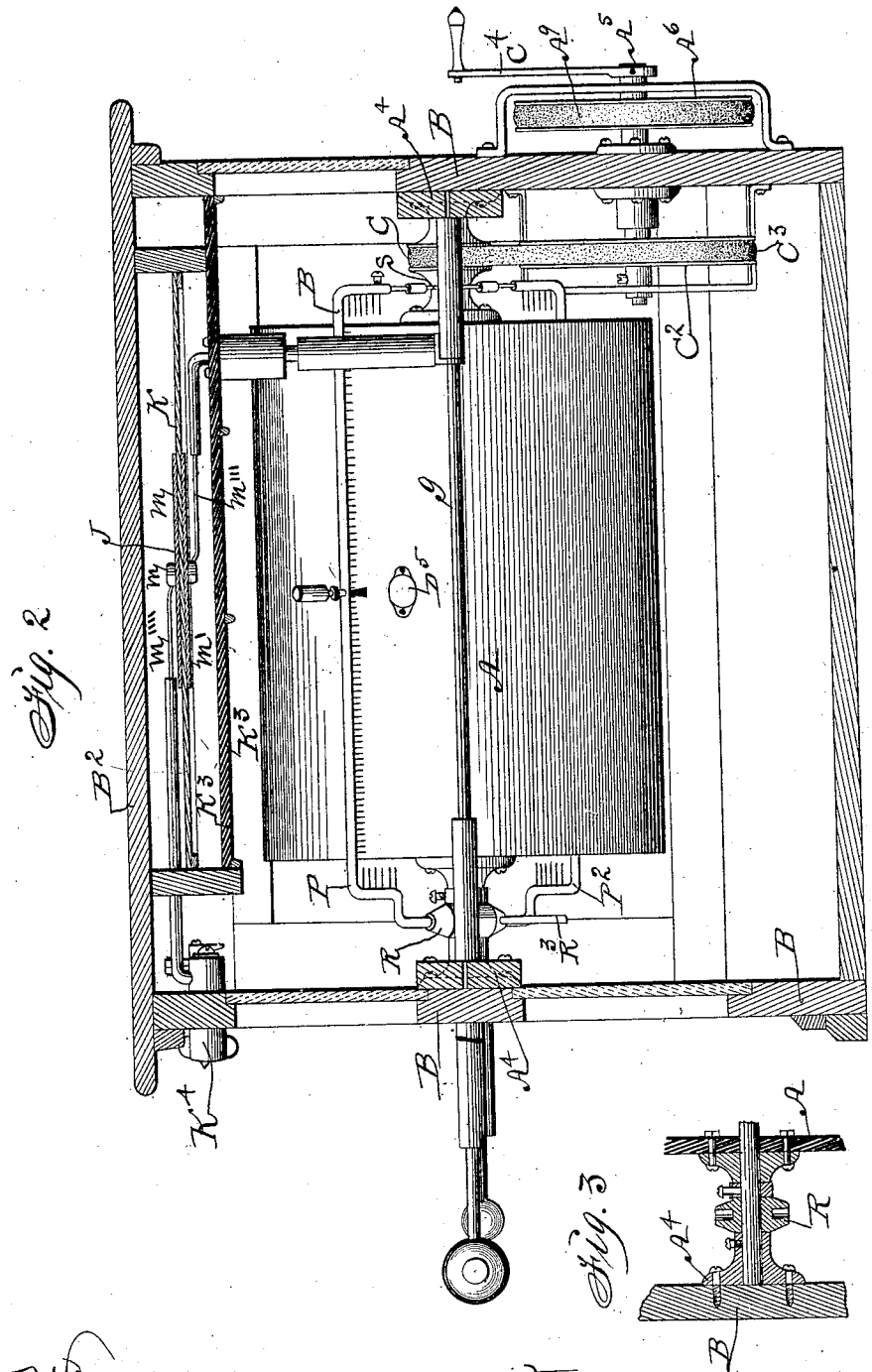
Witnesses:
F.C. Stuart
N.S. Orwig
Inventors:
West Dodd, Wm Alvin D. Struthers,
By Thomas O. Orwig, Attorney No. 646,418. Patented Apr. 3, 1900.
W. DODD & A. D. STRUTHERS.
MACHINE FOR GENERATING AND UTILIZING STATIC ELECTRICITY.
(Application filed July 14, 1899.)
(No Model.) 6 Sheets—Sheet 3.
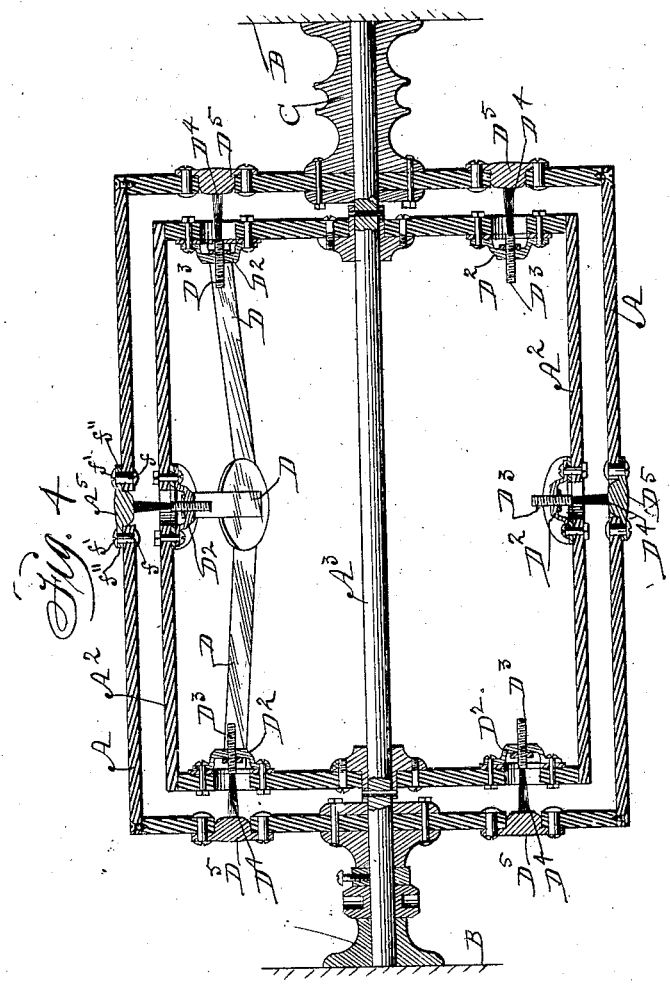

No. 646,418. Patented Apr. 3, 1900.
W. DODD & A. D. STRUTHERS.
MACHINE FOR GENERATING AND UTILIZING STATIC ELECTRICITY.
(Application filed July 14, 1899.)
(No Model.) 6 Sheets—Sheet 4.
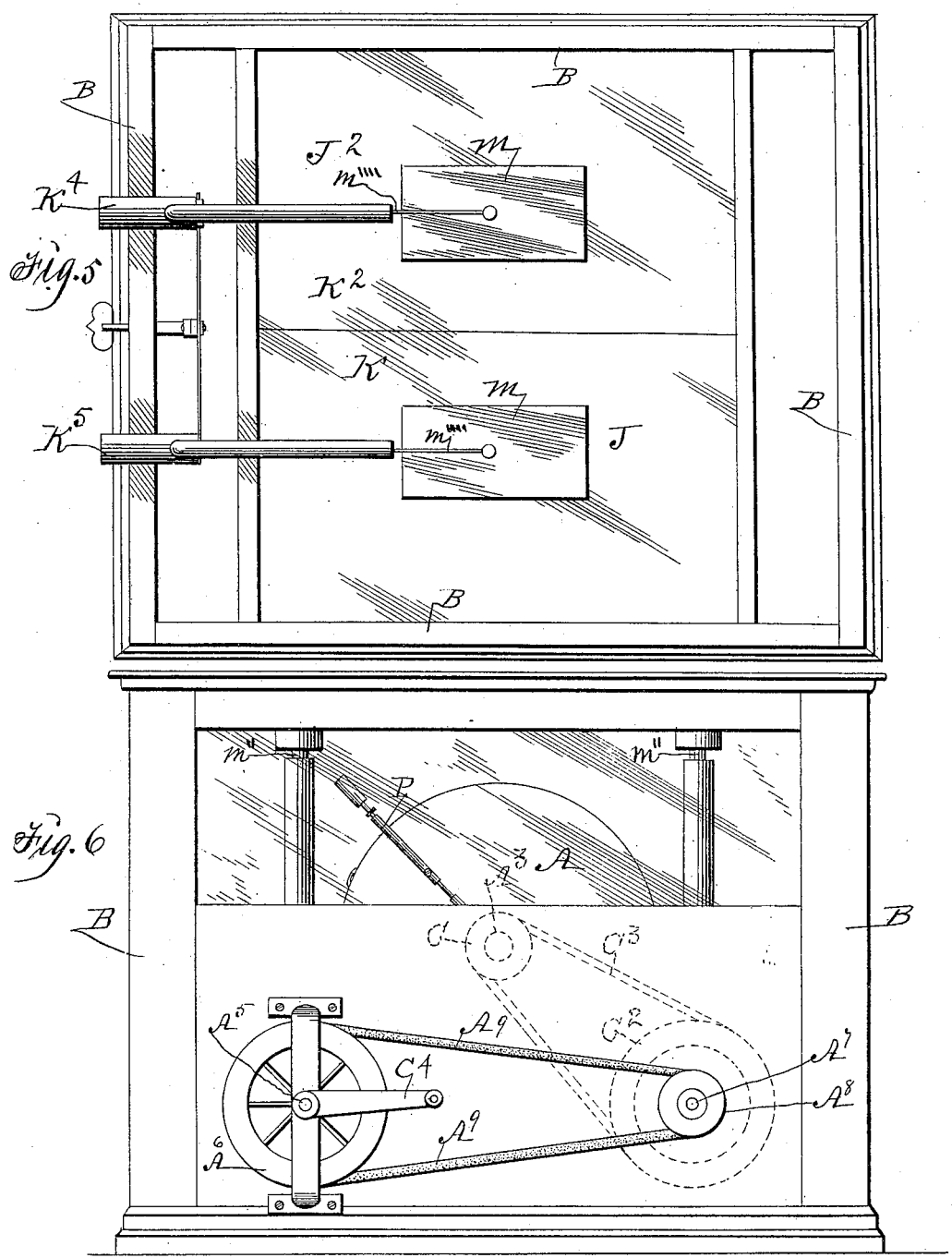

No. 646,418. Patented Apr. 3, 1900.
W. DODD & A. D. STRUTHERS.
MACHINE FOR GENERATING AND UTILIZING STATIC ELECTRICITY.
(Application filed July 14, 1899.)
(No Model.) 6 Sheets—Sheet 5.
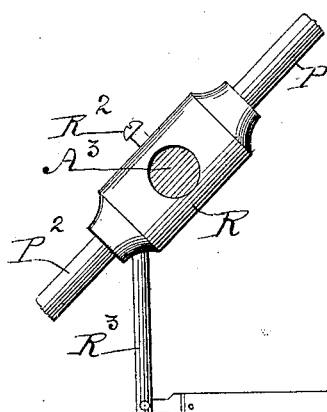
Fig. 1
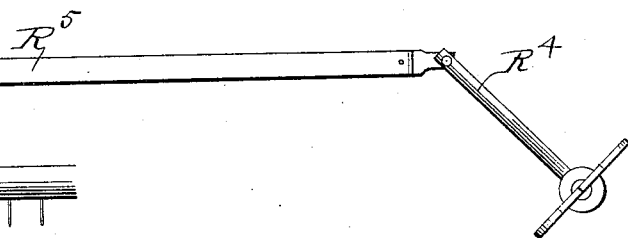
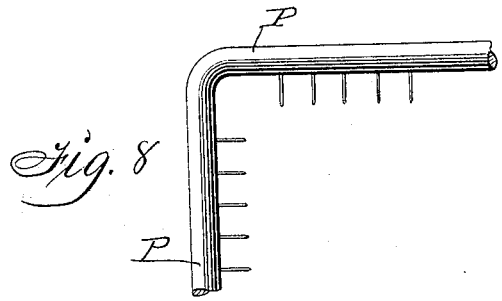
Fig. 9
Fig. 8
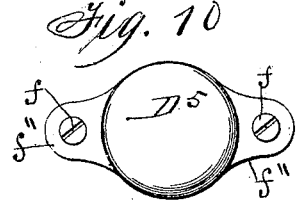
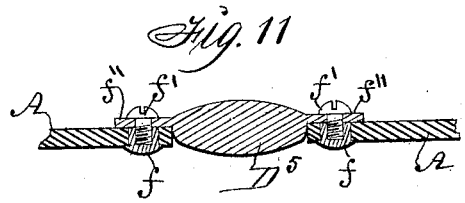
Fig. 10
Fig. 11

No. 646,418. Patented Apr. 3, 1900.
W. DODD & A. D. STRUTHERS.
MACHINE FOR GENERATING AND UTILIZING STATIC ELECTRICITY.
(Application filed July 14, 1899.)
(No Model.) 6 Sheets—Sheet 6.
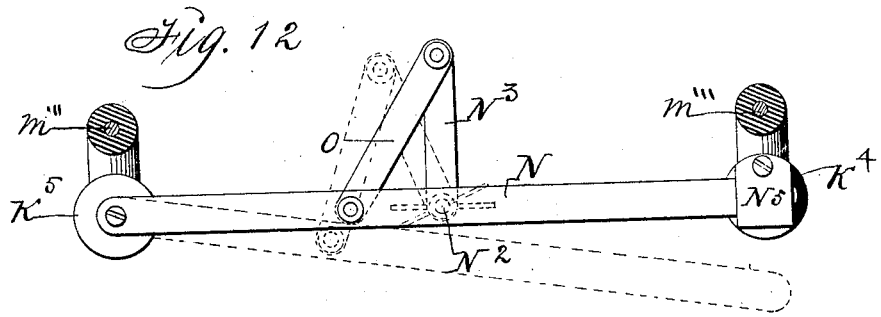
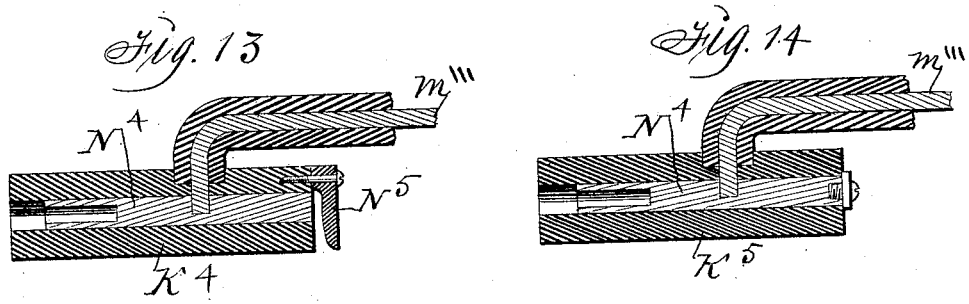
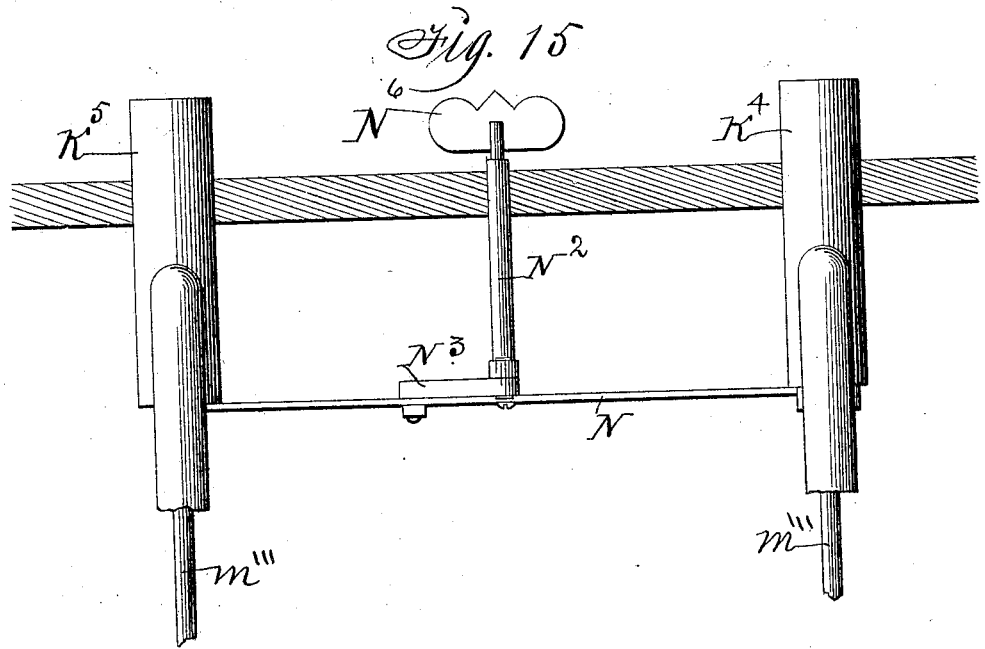

UNITED STATES PATENT OFFICE.

WEST DODD AND ALVIN D. STRUTHERS, OF DES MOINES, IOWA.

MACHINE FOR GENERATING AND UTILIZING STATIC ELECTRICITY.

SPECIFICATION forming part of Letters Patent No. 646,418, dated April 3, 1900.

Application filed July 14, 1899. Serial No. 723,770. (No model.)

*To all whom it may concern:*

Be it known that we, WEST DODD and ALVIN D. STRUTHERS, citizens of the United States, residing at Des Moines, in the county of Polk and State of Iowa, have invented a new and useful Machine for Generating and Utilizing Static Electricity, of which the following is a specification.

Our main object is to overcome difficulties incident to the production of frictional or static electricity by means of rotatable glass disks by utilizing concentric cylinders in place of disks.

Disks of large diameter when rotated at a high rate of speed are subject to centrifugal force and liable to break and fly to pieces, much more so than rotatable cylinders.

Disks are liable to deflect from a right angle relative to the axis of the shaft to which they are fixed, and consequently combs for collecting electricity cannot be brought into as close proximity to the surfaces of disks as they can be to the surface of a cylinder, and the combs can extend the entire length of the cylinder and also its ends to collect electricity from the surface of its circumference and ends simultaneously.

The concentric cylinders will occupy much less space than disks of equal surface, and the inside surface of the outer cylinder and both the inner and outer surfaces of the inner cylinder will be practically inclosed and covered and protected from dust and moisture, while the surfaces of disks are exposed and subject to impairment by foreign substances floating in the air and the humidity of the atmosphere. The brushes applied to the concentric cylinders prevent the leakage incident to the brush connections on disks.

A generator of any given power having concentric cylinders can be in more compact form than a machine in which a disk is used for generating an equal force.

While our main object is to gain all the advantages enumerated, a further object is to prevent the snapping noise incident to the discharges from electrodes.

A further object is to provide improved means for conveying force from the generator advantageously in producing X-rays.

Our invention consists in the construction, arrangement, and combination of elements, as hereinafter set forth, pointed out in our claims, and illustrated in the accompanying drawings, in which—

Figure 1 is a perspective view showing the two concentric cylinders mounted and inclosed in a case adapted to support them and all the operative mechanisms required in the application and practical use of our invention for the various purposes for which it can be used advantageously. Fig. 2 shows one side of the case removed and the positons of various operative parts relative to the case and the concentric cylinders mounted in the case. Fig. 3 is a detail view showing how the shaft upon which the outer cylinder rotates is fixed to the case and the outer cylinder rotatably mounted on the shaft. Fig. 4 is an enlarged longitudinal central sectional view of the two concentric cylinders, showing the application of tin-foil to the inner surface of the inner cylinder, brushes detachably connected with the inner cylinder, and carriers detachably connected with the outer cylinder to contact with the brushes. Fig. 5 shows the top of the case removed to disclose the condensers that are located above the concentric cylinders. Fig. 6 is an end view of the case, showing the gearing for rotating the outer cylinder. Fig. 7 is an enlarged detail view of the mechanism for adjustably connecting the equalizing-comb with the exterior cylinder. Fig. 8 is an enlarged elbow-section of the equalizing-comb. Fig. 9 is a detail view showing the corner of a collecting-comb and the manner of connecting two parts in right-angled positions to each other in combination with an insulating-tube. Fig. 10 is an outside face view of one of the carriers detachably fixed in the outside cylinder. Fig. 11 is a sectional view showing how the carriers are detachably fastened to the cylinder as required for gaining access to brushes detachably and adjustably connected with the inner cylinder, as shown in Fig. 4. Fig. 12 shows a circuit-breaker adapted to be combined with the two condensers. Figs. 13 and 14 are enlarged sectional views of parts of the circuit-breaker mechanism. Fig. 15 is an enlarged top view of the circuit-breaker in position relative to the case as required for establishing a circuit between the condensers and extraneous objects.

The letter A designates the outer cylinder, and $A^2$ the inner cylinder in concentric position. They are preferably made of glass and may vary in size, as desired. The inner cylinder is fixed to a stationary shaft $A^3$ by means of collars fixed to the ends of the cylinder and keys extended through the collars and the shaft or in any suitable way. The shaft $A^3$ extends through the ends of the outer cylinder A and is supported in bearings $A^4$, fixed to central cross-bars in the ends of the frame B of a case, as shown in Figs. 2, 3, and 4. Transparent glass is fixed in the ends and sides of the case, and $B^2$ is a movable top detachably fixed upon the top of the frame by means of screws to completely close the case as required to protect the cylinders and operative parts inclosed within the case from dust, humidity of the atmosphere, or other matters that have a deleterious effect upon the operation of the machine.

$A^5$ is a driving-shaft in bearers fixed to the end of the frame B of the case, as shown in Fig. 2, and $A^6$ is a belt-wheel fixed to the shaft and outside of the case.

$A^7$ is a mating shaft in the same plane and supported by a bearing fixed inside the case. It has a small belt-wheel $A^8$ fixed to its end portion outside of the case, and $A^9$ is a belt on the wheels $A^6$ and $A^8$, that connects the two shafts as required to transmit motion from one to the other and to increase speed. A small belt-wheel C, loose on the shaft $A^3$ and its hub fixed to the outer cylinder, a larger wheel $C^2$ on the shaft $A^7$ and a belt $C^3$, connects the wheel C with the wheel $C^2$, and a small wheel $A^8$ on the shaft $A^7$, connected with the drive-wheel $A^6$ on the shaft $A^5$ by the belt $A^9$, are combined as required for rotating the outer cylinder A by operating the crank $C^4$ on the shaft $A^5$.

On the inner surface of the inner cylinder $A^2$ are fixed pieces of tin-foil D to serve as inductors to induce electricity on the cylinder A. Over openings in the inner cylinder are fixed metal frames or bearers $D^2$, that contact with the thin metal D and are provided with screw-threaded bores at their centers, through which the screws $D^3$ are extended to be detachably and adjustably connected with the inner cylinder to serve as handles for brushes $D^4$, made of metal wires fixed to the outer ends of the handles, as shown in Fig. 4. Openings in the outer cylinder coincide with the openings in the inner cylinder, as required for gaining access to the brushes $D^4$, and in the openings in the outer cylinder are fitted the carriers $D^5$ and detachably fixed to the cylinder A by means of screw-seats $f$, fixed in the cylinder, and screws $f'$, extended through the perforated ears $f''$, integral with the carriers, as clearly shown in Fig. 11, or in any suitable way that will allow the removal of the carriers whenever desired. By having brushes $D^4$ and carriers $D^5$ in the ends of the cylinder and also in the center of the cylinder and combs that have elbow-shaped ends the entire surfaces of the two cylinders can be utilized for generating and gathering electricity, and consequently the maximum power of a generator of any given size and weight greatly increased.

Combs $g$, that have elbows $g'$ at their ends, constructed as shown in Fig. 9, and outward extensions $g''$ from the elbows, are fitted in insulating-tubes $g'''$, and said tubes are fixed in end portions of the frame B of the case, as shown in Figs. 1 and 2, and electrically connected with condensers, as hereinafter stated and as required to charge the condensers. Electrode-supports $h$ are fixed to the extensions $g''$, and electrode-dischargers $h'$ are on the ends of the bars $h''$, slidingly connected with the supports $h'$.

To prevent the noise incident to discharges of electricity from the dischargers, elbow-shaped pointers $i$ are pivotally connected with the dischargers $h'$, as shown in Fig. 1 and in such a manner that they may be readily turned out of alinement with each other and made inoperative by such adjustment.

To adapt our machine to be advantageously used for connecting "Crookes tube" therewith for producing X-rays, means for regulating discharges relative to the various conditions of the vacuum are required, and we have fixed balls $h'''$ on the ends of the stems, fixed in insulators $h''''$, that project outward from the frame of the case, as shown in Fig. 1, in such a manner that the dischargers $h'$ can be readily adjusted relative to the stationary balls $h'''$, as required to regulate the resistance between them. Wires for connecting the ends of a Crookes tube with the fixed stems of the balls $h'''$ can be readily detachably fixed to said stems, as required for establishing a circuit with the tube for producing X-rays by the operation of our invention. Condensers or accumulators J and $J^2$ are adapted in form to be fixed in the top of the case over the concentric cylinders and connected therewith in such a manner that the accumulators can be charged positively and negatively as "Leyden" jars are charged.

The accumulators are composed, preferably, of two pieces K and $K^2$ of plate glass of uniform size, as shown in Fig. 5, and inclosed and supported in a compartment of the case, as shown in Fig. 2, or in any suitable way. Pieces of tin-foil $m$ on their top faces and corresponding pieces $m'$ on their bottom faces are centrally located on these mating glass plates, and their surfaces surrounding the tin-foil are coated with suitable insulating material. A metal conductor $m''$ is fixed to the center of the tin-foil $m'$ and connected with the part $g$ of the double elbow-shaped comb, as shown in Figs. 1 and 2, by means of an insulated wire $m'''$ and as required to charge the condenser K. A corresponding connection (not shown) is made between the other fixed comb and the condenser $K^2$, as required to charge it.

An insulating-plate $K^3$ is interposed between the condensers and the concentric cylinders, as shown in Fig. 2 or in any suitable way. Couplers K⁴ and K⁵ are fixed in the frame of the case and connected with the tinfoils m on the tops of the plates K and K² by means of insulated conductors m'''', as required to establish a current for subjecting persons to the influence of electricity as a remedial agent for many of the disorders and diseases that flesh is heir to. A circuit-breaker composed of a metal bar N is pivoted at one end to the inner end of the coupler K⁵ and detachably connected with the inner end of the coupler K⁴, as shown in Figs. 5, 12, and 15. A rock-shaft N², mounted in the frame of the case B, has an arm N³, made of rubber, pivotally and slidingly connected with the central portion of the bar N by means of a link O in such a manner that the free end of the bar can be raised and lowered by operating the rock-shaft as required to connect the bar with the metal center N⁴ of the coupler. N⁵ is a rubber clasp fixed to the end of the coupler N⁴, as shown in Figs. 12 and 13 and as required to press and retain the bar N in contact with the end of the metal core or center N⁴ of the coupler. A finger-hold N⁶ on the outer end of the rock-shaft N² facilitates the operation of the rock-shaft as required for connecting and breaking the circuit at pleasure.

An equalizing-comb surrounds the exterior of the outer cylinder A, as shown in Fig. 1, and is adjustably connected therewith. It is composed of two mating parts P and P², that are connected at their ends and with the shaft A³ by means of couplings in such a manner that they can be adjusted relative to the cylinders and the condensers. R is a coupling adjustably connected with the shaft, as clearly shown in Figs. 2 and 3, in such a manner that it can be clamped fast to the shaft by means of a set-screw R². The other ends of the parts P and P² are connected with a ring or frame s, that is rotatably connected with a collar on the shaft A³. An arm R³ is fixed to the coupling R and connected with an elbow-shaped lever R⁴ by means of a straight bar R⁵, as shown in Fig. 7, in such a manner that by actuating the lever the equalizing-comb can be readily adjusted relative to the fixed combs, as required for fixing and maintaining the polarity of the machine and regulating a current relative to extraneous objects.

The elbow-shaped points i, in connection with the dischargers, act as a governor when producing ozone in electrotherapeutics and govern the strength of sparks and currents when applying roller and ball treatment to patients and also completely prevent any noise or snapping of electricity in its passage from the machine.

From the foregoing description of the construction and function of each element and subcombination the practical operation and utility of our invention will be understood by persons familiar with the art to which it pertains, and What we therefore claim as new, and desire to secure by Letters Patent therefor, is—

1. In a machine for generating static electricity, the combination of two concentric cylinders both closed at their ends and each provided with openings adapted to be brought into coinciding positions, means for retaining the inner cylinder stationary and means for rotating the outer cylinder, for the purposes stated.

2. The combination of a stationary shaft, a cylinder closed at its ends and fixed to the shaft, a rotatable cylinder having closed ends and mounted on the shaft and in concentric position with the inner cylinder fixed to the shaft and outside thereof and each cylinder provided with openings adapted to be placed in coinciding positions by moving the outer cylinder, means for electrically connecting the two cylinders and means for rotating the outer cylinder, for the purposes stated.

3. In an electric generator, two concentric cylinders, the inner stationary and the outer rotatable, pieces of tin-foil fixed on the inner surface of the inner cylinder, openings at different points of the inner cylinder, brush-holders fixed over the openings, brushes connected with the brush-holders, coinciding openings in the outer cylinder and carriers fixed therein, to operate in the manner set forth and for the purposes stated.

4. In an electric generator, two concentric cylinders, the inner stationary and the outer rotatable, pieces of tin-foil fixed on the inner surface of the inner cylinder, openings at different points of the inner cylinder, brush-holders fixed over the openings, brushes connected with the brush-holders, coinciding openings in the outer cylinder, carriers fixed therein, and collecting-combs on the outside of the outer cylinder, to operate in the manner set forth and for the purposes stated.

5. The cylinder A² having openings at various points, the tin-foils D fixed on the inner surface of the cylinder, brush-bearers D² fixed over the openings and contacting with the tin-foils, brush-holder screws D³ adjustably and detachably connected with the bearers and brushes D⁴ fixed to the holder-screws, arranged and combined as shown and described for the purposes stated.

6. The cylinder A² having openings at various points, tin-foils D fixed on the inner surface of the cylinder, brush-bearers D² fixed over the openings and contacting with the tin-foils, brush-holder screws D³ adjustably and detachably connected with the bearers and brushes D⁴ fixed to the holder-screws, and a concentric rotatable cylinder of larger diameter having coinciding openings and carriers detachably fixed therein, all arranged and combined as shown and described for the purposes stated.

7. The rotatable cylinder A, having openings located at different points and insulator screw-seats $f$, inductors $D^5$ having perforated extensions $f''$, screws $f'$ fitted in said seats, in combination with the cylinder $A^2$ having coinciding openings, brush-holders fixed over the openings, tin-foils fixed to the inside surface and contacting with the brush-holders, and brushes detachably and adjustably connected with the holders, all arranged and combined to operate in the manner set forth for the purposes stated.

8. In an electric machine, two concentric cylinders, the inner cylinder stationary and the outer rotatable, two elbow-shaped collecting-combs extended over the outer surface of the outer cylinder and two condensers, arranged and combined to operate in the manner set forth for the purposes stated.

9. In an electric machine, two concentric cylinders, the inner cylinder stationary and the outer rotatable, two elbow-shaped collecting-combs extended over the outer surface of the outer cylinder and two condensers, and two electrodes slidingly connected with the combs, arranged and combined to operate in the manner set forth for the purposes stated.

10. Condensers composed of plate-glass, tin-foils on their top and bottom surfaces, couplers electrically connected with the condensers, a circuit-breaker between the two condensers, two concentric cylinders and two collecting-combs, arranged and combined in a case to operate in the manner set forth for the purposes stated.

11. Two condensers, two couplers $K^4$ and $K^5$ electrically connected with the condensers, a bar N pivoted to one of the couplers, a rock-shaft $N^2$ having an arm $N^3$ and a link O arranged and combined with two concentric cylinders, two collecting-combs and a case, as shown and described for the purposes stated.

12. In an electric machine, an equalizing-comb adjustably and electrically connected with the outside surface of a rotatable cylinder, means for adjusting the comb and means for rotating the cylinder, for the purposes stated.

13. An equalizing-comb comprising two mating parts P and $P^2$, a coupling R and set-screw $R^2$, in combination with the shaft $A^3$, the cylinder A loosely mounted on said shaft and means for adjusting the comb relative to the cylinder, for the purposes stated.

14. Two concentric cylinders, a shaft fixed to the inner cylinder and the outer cylinder rotatably mounted on the shaft, an equalizing-comb adjustably connected with the shaft by means of a coupling R and a ring $s$, an arm $R^3$ fixed to the coupling, a rock-shaft $R^4$ and a bar $R^5$, arranged and combined with a case as shown and described for the purposes stated.

15. In an electric machine, pointers pivotally connected with balls on the ends of adjustable electrodes, to operate in the manner set forth for the purposes stated.

16. In an electric machine, the elbow-shaped pointers $i$ in combination with the balls $h'$ on the ends of the sliding electrodes $h$, as shown and described for the purposes stated.

17. In an electric machine, fixed electrode-supports, electrodes slidingly connected with the supports and fixed insulated dischargers, arranged and combined to operate in the manner set forth for the purposes stated.

18. The cylinder A, the cylinder $A^2$ inside thereof, the fixed shaft $A^3$, the driving-shaft $A^5$ having a fixed wheel $A^6$, the shaft $A^7$ having fixed wheels $A^8$ and $C^2$, the wheel C loose on the shaft $A^3$ and its hub fixed to the cylinder A, the belts $C^3$ and $C^4$ and a case for inclosing and supporting the cylinders and operative mechanisms connected therewith, arranged and combined as shown and described to operate in the manner set forth for the purposes stated.

19. A machine for generating and utilizing static electricity comprising a case, a shaft fixed to the parallel ends of the case, a cylinder fixed to the shaft inside of the case and provided with openings at different points, brush-bearers fixed over the openings, tin-foils fixed to the inside surface of the cylinder and contacting with the brush-bearers, brushes connected with the bearers and extended out through the openings, a concentric rotatable cylinder having coinciding openings and carriers fixed in the openings, collecting-combs having elbows at their ends connected with the frame of the case and their ends extended outward through the case and provided with electrode-supports, electrodes having dischargers at their inner ends slidingly connected with the supports, condensers in the upper part of the case electrically connected with the collecting-combs, a circuit-breaker connected with the two condensers, an adjustable equalizing-comb connected with the stationary shaft, means for adjusting the equalizing-comb, and means for rotating the outer cylinder, all arranged and combined to operate in the manner set forth for the purposes stated.

WEST DODD.
ALVIN D. STRUTHERS.

Witnesses:
  F. C. STUART,
  THOMAS G. ORWIG.